Patented July 29, 1941

2,251,214

UNITED STATES PATENT OFFICE 2,251,214

TERPENE ETHERS AND METHOD OF PREPARATION THEREOF

Donald H. Sheffield, Brunswick, Ga., assignor to Hercules Powder Company, Wilmington, Del., a corporation of Delaware No Drawing. Application October 28, 1939, Serial No. 301,761

12 Claims. (Cl. 260—611)

This invention relates to a method for the production of certain ethers of terpene compounds and to the products thereof. More particularly, it relates to a method for the production of halogen containing terpene ethers by the addition of a halogen substituted alcohol to an unsaturated terpene compound and to the products thereby obtained.

The ethyl ether of camphene has been produced heretofore by the reaction of ethyl alcohol with the complex cyclic terpene, camphene, in the presence of sulfuric acid as a catalyst. Thus, Semmler (Ber. 33 pp. 3420–32) produced such a compound by boiling a mixture of camphene, ethyl alcohol and sulfuric acid under reflux for several hours. He, likewise, succeeded in producing the ethyl ethers of nopinene and sabinene, but was entirely unsuccessful in producing the ethyl ether of the monocyclic terpene, limonene. Terpene ethers of halogen substituted organic radicals have not been prepared previous to my invention thereof due to instability of the product under the conditions of ether formation heretofore used.

The method in accordance with this invention consists of reacting an unsaturated terpene compound with a chlorohydrin or other halogen substituted alcohol in the presence of a suitable acid catalyst at a temperature within the range of about 30° C. to about 60° C. The reaction produced by this method appears to involve the addition of the acid catalyst to one or more double bonds of the unsaturated terpene, to produce an unstable intermediate compound which reacts with the halogen substituted alcohol to produce an ether. The ether obtained is an ether of a radical of a terpene compound and a halogen substituted organic radical. When reacting a terpene with more than one double bond, ethers can be produced in which one or more halogen substituted alcohol radicals are linked to the terpene radical. When reacting a halogen substituted polyhydric alcohol, ethers can be produced in which one or more terpene molecules may be linked to the alcohol radical.

Suitable catalysts for this reaction include inorganic acids, such as sulfuric acid and phosphoric acid, or the organic substituted inorganic acids of sulfur, such as, for example, methyl sulfuric acid, ethyl sulfuric acid, phenol sulfonic acid, benzene sulfonic acid, p-toluene sulfonic acid, etc., as more fully disclosed in the application of Irvin W. Humphrey, Serial No. 67,704, dated November 8, 1938, now Patent No. 2,136,011.

The concentration of catalyst used in the reaction may be varied over a wide range. Thus, the amount of catalyst used, calculated as sulfuric acid, may be within about the range of 0.1% to 50.0% of the weight of the halogen substituted alcohol contained in the reaction mixture, and will preferably be within the range of 15% to 25%.

The terpene compound reacted by the method in accordance with this invention may be an unsaturated monocyclic terpene compound such as, for example, dipentene, terpinene, terpinolene, alpha terpineol, beta terpineol, or mixtures thereof; or it may be an unsaturated complex cyclic terpene, for example, alpha pinene, beta pinene, camphene, carene, cabinene, and bornylene.

These terpene compounds need not be in the form of pure compounds to be treated in accordance with this invention, but may be reacted in crude form. Thus, in place of the several pure terpene compounds, crude natural mixtures of terpene compounds as, for example, turpentine, pine oil, etc., or mixtures of terpenes with petroleum or other saturated hydrocarbons may be used. Various fractions from these mixtures may also be used without the necessity of isolating the compounds in their pure state.

The halogen substituted alcohol used in the method according to this invention may be conveniently an aliphatic chlorohydrin, such as ethylene chlorohydrin, since these compounds are most readily available. The chlorohydrins of ethylene, propylene, butylene, amylene, isoamylene, etc., are examples. The corresponding bromohydrins, such as ethylene, propylene, butylene, etc., bromohydrins, may also be used to give bromine substituted alkyl ethers of terpenes. Similarly, iodohydrins may be used. Other halogen substituted alcohols may be used, for example, dichloroethanol, dichloropropanol, 3-chloropropanol, 3-chloropropylene glycol, monochlorobutylene glycol, dichlorobutylene glycol, chloroleyl alcohol, chlorobenzyl alcohol, dichlorobenzyl alcohol, etc., and the equivalent bromo and iodo compounds.

The relative proportions of the halogen substituted alcohol and the terpene compound in the reaction mixture will depend on the molecular weight of the alcohol. To obtain the highest yields of the terpene ether, it is desirable to use not less than one and one-half moles, and preferably at least three moles of the alcohol per mole of the terpene compound.

In carrying out the method in accordance with this invention, the terpene compound, alcohol, and catalyst employed are mixed and preferably well agitated. The temperature is maintained in the range from 30° C. to 60° C., preferably in the range from 40° C. to 50° C. Since the reaction is in general exothermic, cooling is usually necessary to maintain the temperature in the range desired. Upon completion of the reaction, the ether obtained is isolated from the reaction mixture. For example, the reaction mixture is washed with water or with an alkaline water solution or with both to remove acid and any water-soluble constituents and the ether is then separated from terpene hydrocarbons and by-products by fractional distillation under reduced pressure.

The method in accordance with this invention is illustrated by the specific examples following. All parts and percentages are by weight unless otherwise specified.

*Example 1*

Four hundred grams of alpha pinene were added to 600 grams of ethylene chlorohydrin and 12 grams of 75% sulfuric acid and the mixture well agitated. The reaction which took place evolved heat; the temperature was maintained at 45° C. by cooling. After three hours the reaction was complete. Acid and excess ethylene chlorohydrin were then removed by two washes of about 500 grams each of 10% sodium carbonate water solution. The resulting oil was then fractionated into two components by distillation. One fraction consisted of terpene hydrocarbons, the other consisted essentially of terpinyl beta-chloroethyl ether.

The terpinyl beta-chloroethyl ether fraction had the following properties:

Boiling range at 8 millimeters absolute pressure _____ 115–130° C.
Specific gravity at 15.6° C _____ 1.0126
Refractive index at 20° C _____ 1.4807
Color _____ Water white

*Example 2*

One hundred fifty grams of gum turpentine were added to 125 grams ethylene bromohydrin and 25 grams of 85% phosphoric acid and the mixture agitated. Heat evolved by the reaction was removed by cooling to hold the reaction mixture below 50° C. Reaction was complete in two hours after which acid and excess ethylene bromohydrin were removed by washing with 500 grams of 10% caustic soda water solution. The neutralized oil was then distilled into two fractions. One fraction consisted of terpene hydrocarbons with a small percentage of ethylene bromohydrin. The other fraction consisted essentially of terpinyl beta-bromoethyl ether.

The terpinyl beta-bromoethyl ether had the following properties:

Boiling range at 44 millimeters absolute pressure _____ 140–155° C.
Specific gravity at 15.6° C _____ 1.1472
Refractive index at 20° C _____ 1.4939

*Example 3*

Five hundred grams of gum turpentine were added to 650 grams of propylene chlorohydrin and 100 grams of 85% phosphoric acid. Heat evolved by the reaction was removed by cooling, the temperature being held at 40–45° C. for seven hours. The reaction mixture was then washed with 1000 grams of water and then with 500 grams of 10% caustic soda water solution. The neutralized oil was then distilled in vacuo. A fraction boiling in the range of 145°–165° C. at an absolute pressure of 50 millimeters and consisting essentially of terpinyl monochloroisopropyl ether was obtained.

The terpinyl monochloroisopropyl ether fraction had the following properties:

Boiling range at 50 millimeters absolute pressure _____ 145–165° C.
Specific gravity at 15.6° C _____ 0.9817
Refractive index at 20° C _____ 1.4791

The ethers of the radicals of a terpene compound and a halogen substituted alcohol produced in accordance with this invention are useful as solvents and plasticizers in plastics, protective coatings, and printing inks. They are also useful as intermediates in the preparation of other compounds by reaction upon their halogen substituents.

The term "pinene" in the claims is intended to include both the alpha and beta forms of pinene.

This application is a continuation-in-part of my pending application, Serial No. 64,169, filed February 15, 1936.

It will be understood that the details and examples hereinbefore set forth are illustrative only, and that the invention as broadly described and claimed is in no way limited thereby.

What I claim and desire to protect by Letters Patent is:

1. The method of producing a halogen containing terpene ether which includes reacting an unsaturated terpene compound with a halogen substituted alcohol in the presence of a suitable acidic catalyst at a temperature within the range from about 30° C. to about 60° C.

2. The method of producing a halogen containing terpene ether which includes reacting an unsaturated terpene compound with a halogen substituted aliphatic alcohol in the presence of a suitable acidic catalyst at a temperature within the range from about 30° C. to about 60° C.

3. The method of producing a halogen containing terpene ether which includes reacting an unsaturated terpene compound with a chlorohydrin in the presence of a suitable acidic catalyst at a temperature within the range from about 30° C. to about 60° C.

4. The method of producing a halogen containing terpene ether which includes reacting an unsaturated terpene compound with a chloropropylene glycol in the presence of a suitable acidic catalyst at a temperature within the range from about 30° C. to about 60° C.

5. The method of producing a halogen containing terpene ether which includes reacting pinene with a halogen substituted alcohol in the presence of a suitable acidic catalyst at a temperature within the range from about 30° C. to about 60° C.

6. The method of producing a halogen containing terpene ether which includes reacting pinene with ethylene chlorohydrin in the presence of a suitable acidic catalyst at a temperature within the range from about 30° C. to 60° C.

7. The method of producing a halogen containing terpene ether which includes reacting pinene with propylene chlorohydrin in the presence of a suitable acidic catalyst at a temperature within the range from about 30° C. to 60° C.

8. The method of producing a halogen containing terpene ether which includes reacting pinene with 3-chloropropylene glycol in the presence of a suitable acidic catalyst at a temperature within the range from about 30° C. to 60° C.

9. A terpinyl ether of a halogen substituted lower aliphatic hydrocarbon radical.

10. Terpinyl beta-chloroethyl ether.

11. Terpinyl monochloroisopropyl ether.

12. A terpinyl ether of 3-chloropropylene glycol.

DONALD H. SHEFFIELD.

CERTIFICATE OF CORRECTION.

Patent No. 2,251,214. July 29, 1941.

DONALD H. SHEFFIELD.

It is hereby certified that error appears in the printed specification of the above numbered patent requiring correction as follows: Page 1, second column, line 10, for "cabinene" read --sabinene--; and that the said Letters Patent should be read with this correction therein that the same may conform to the record of the case in the Patent Office.

Signed and sealed this 2nd day of September, A. D. 1941.

(Seal)

Henry Van Arsdale,
Acting Commissioner of Patents.